Dec. 19, 1944.　　　J. V. MARTIN　　　2,365,205
WAVE RIDING SPEED VESSEL
Filed Nov. 7, 1940　　　8 Sheets-Sheet 1
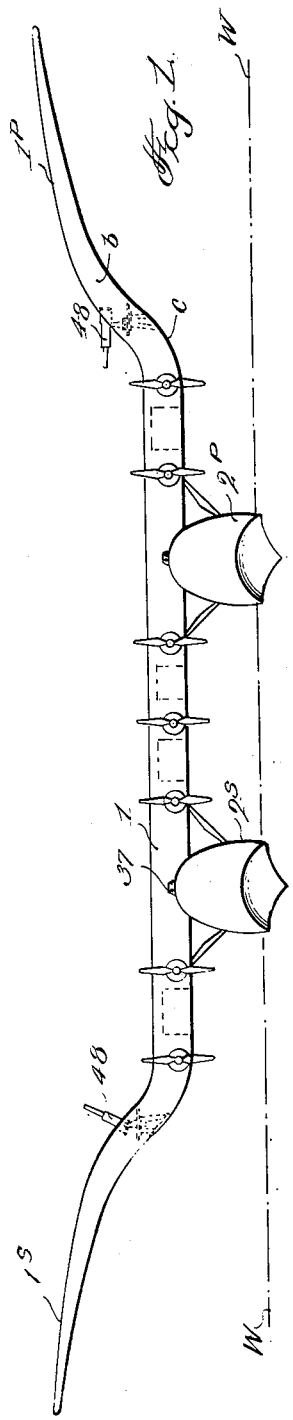
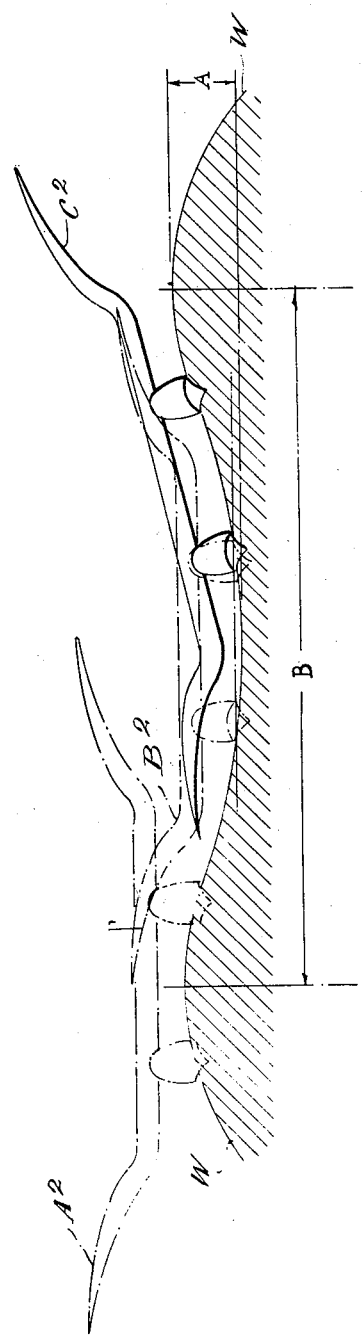
Inventor
James V. Martin

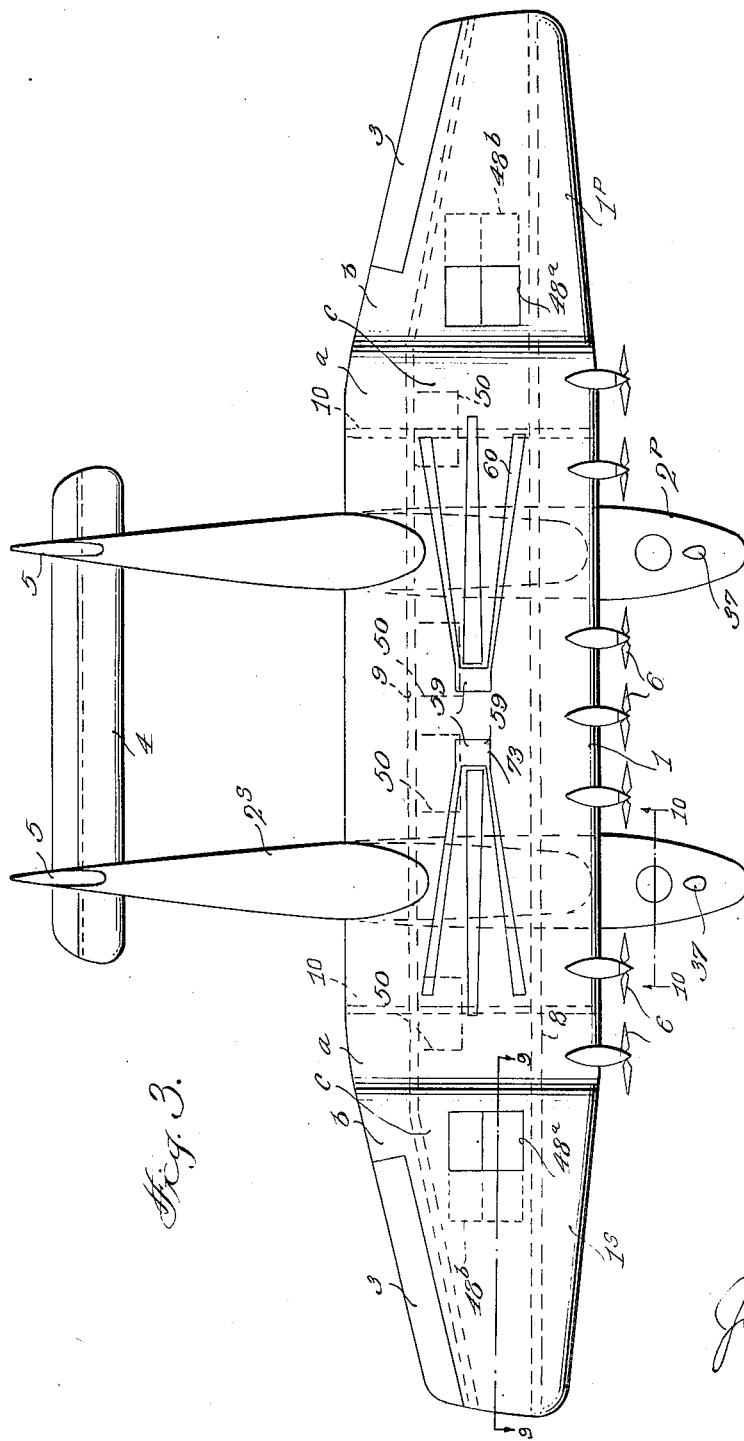

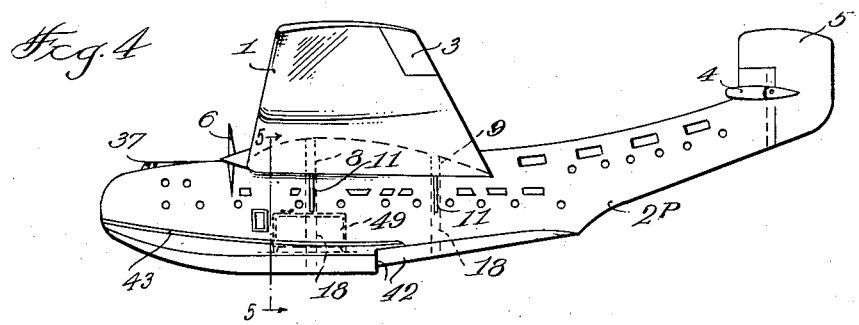
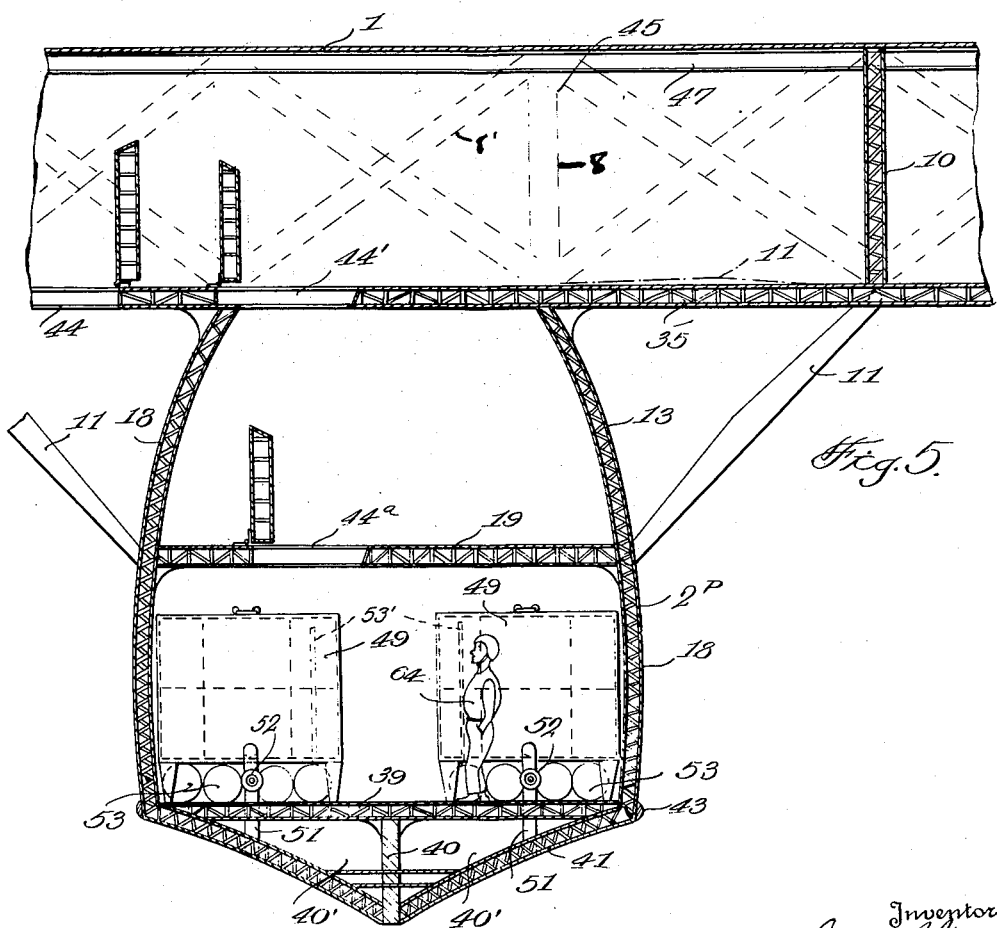

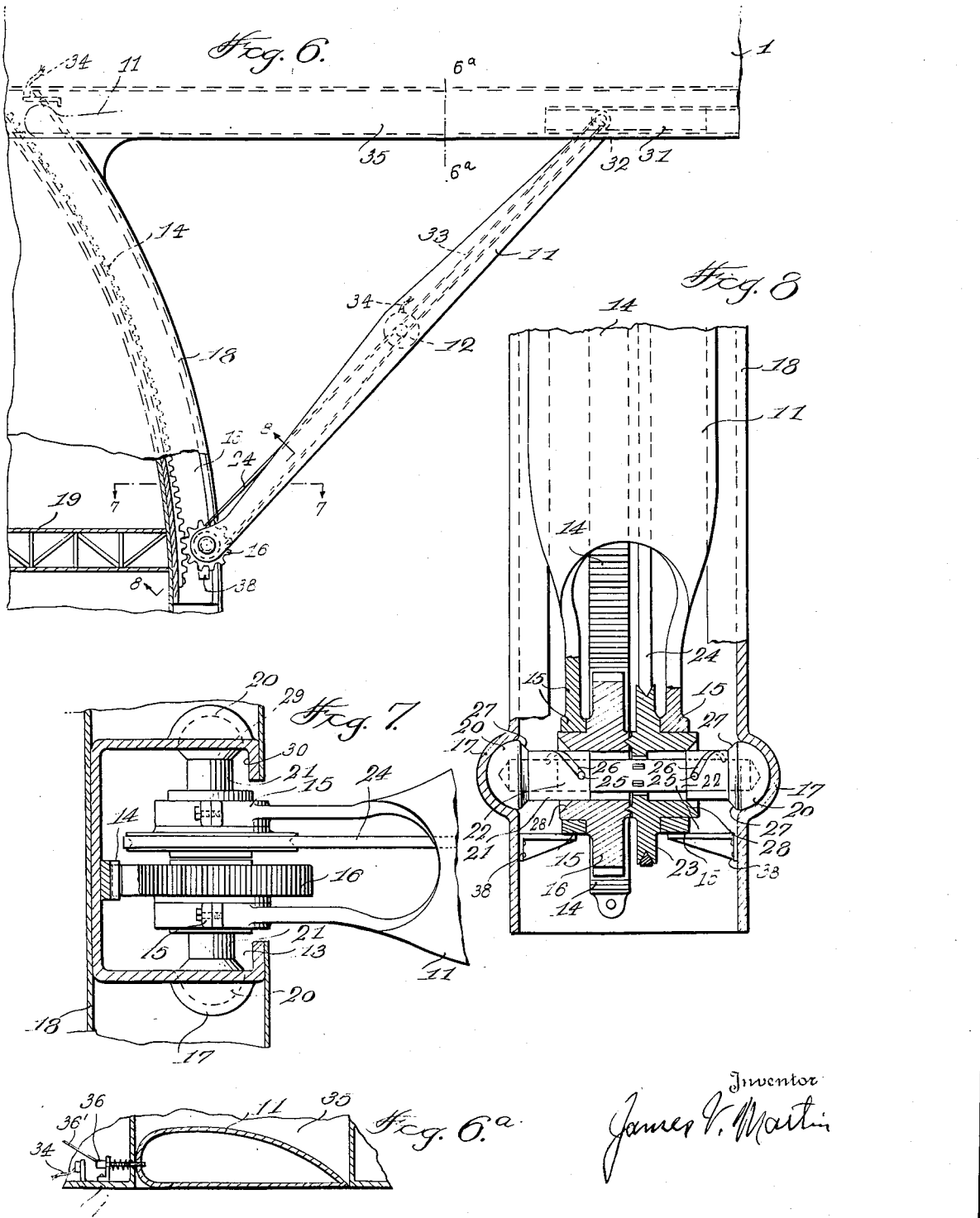

Dec. 19, 1944.  J. V. MARTIN  2,365,205
WAVE RIDING SPEED VESSEL
Filed Nov. 7, 1940  8 Sheets-Sheet 5
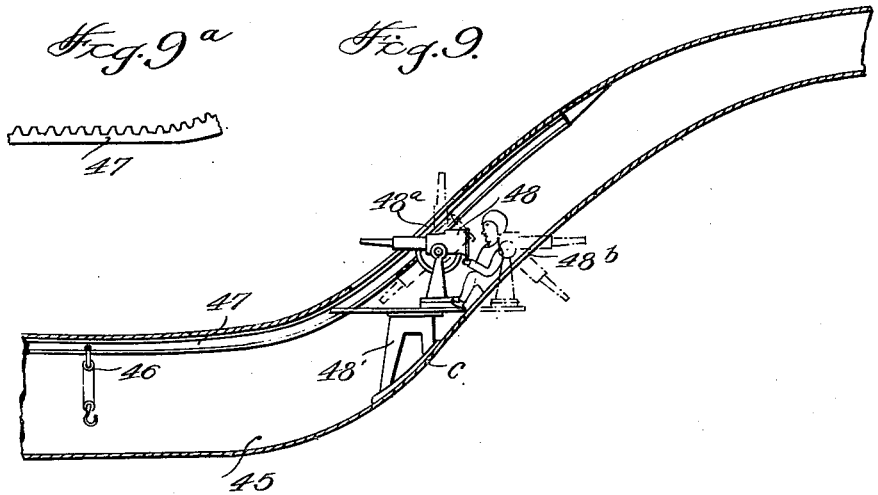
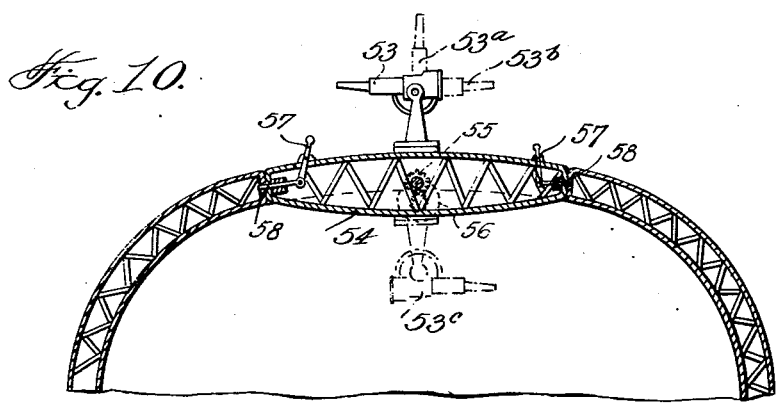
Inventor
James V. Martin

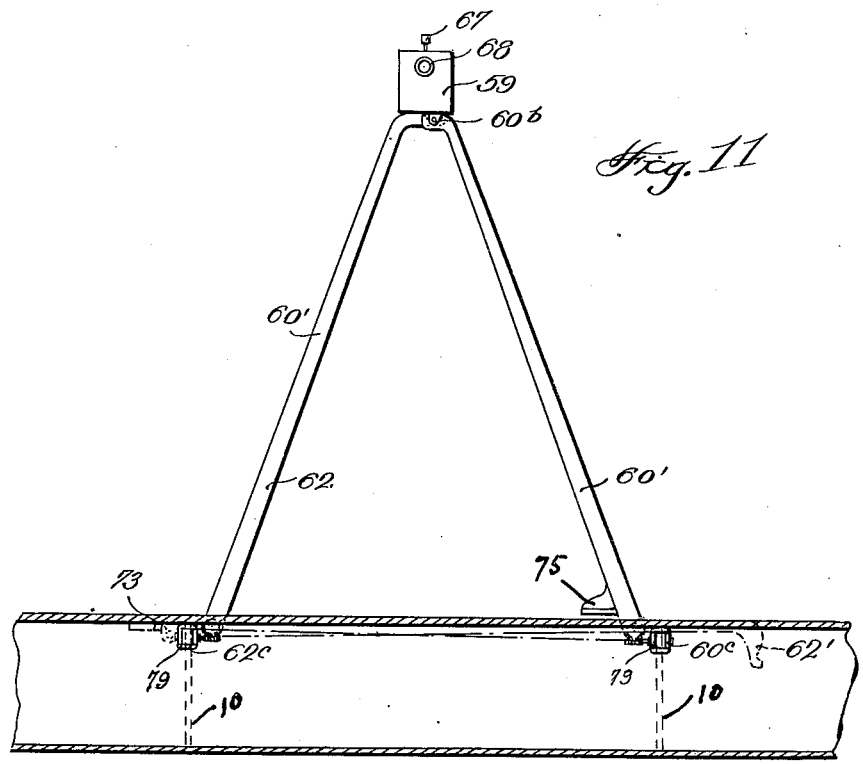
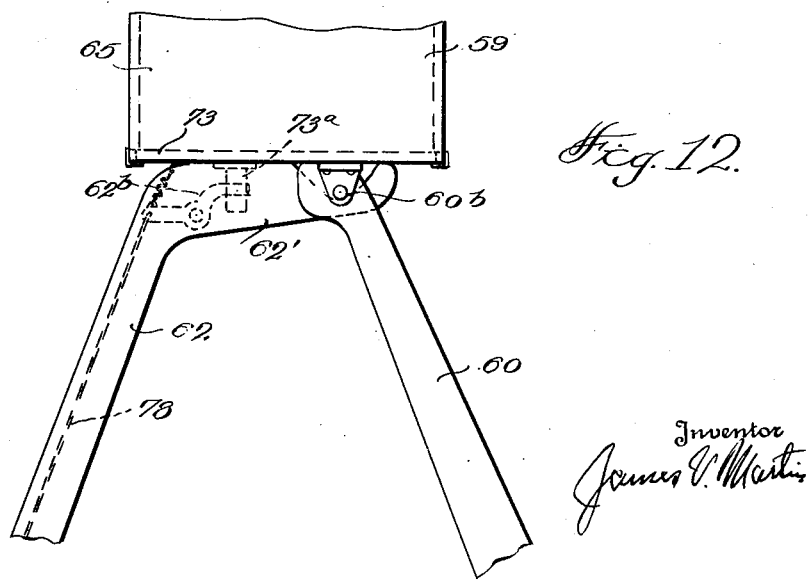

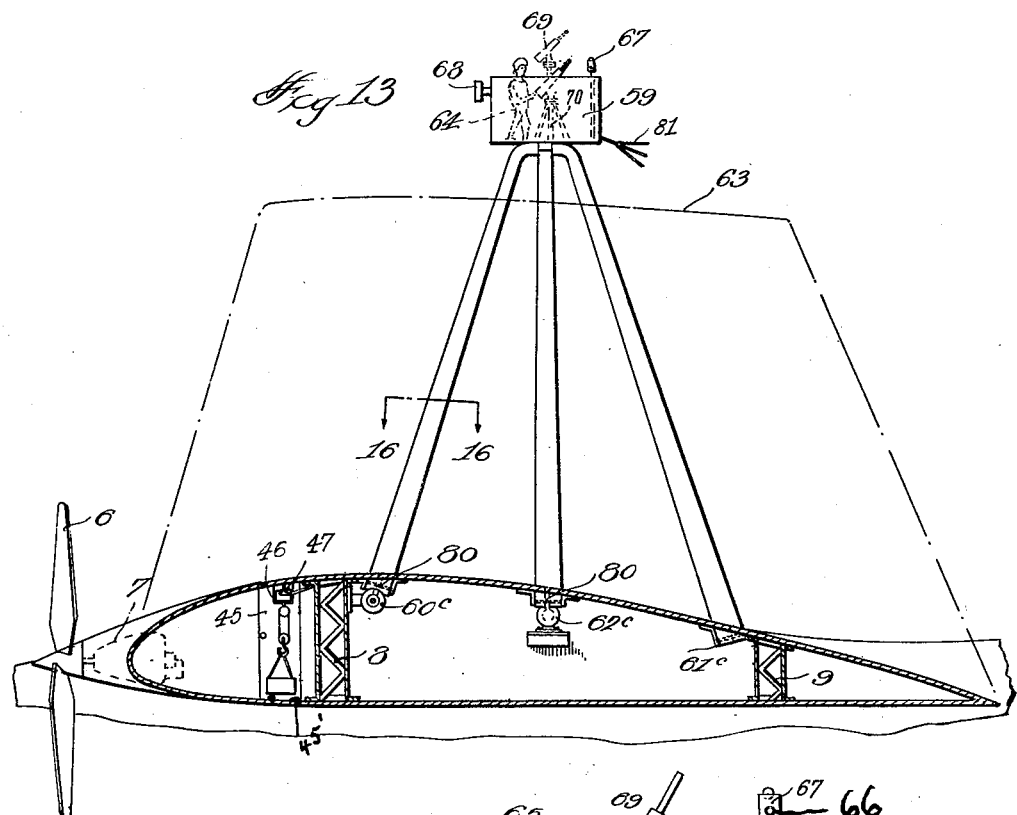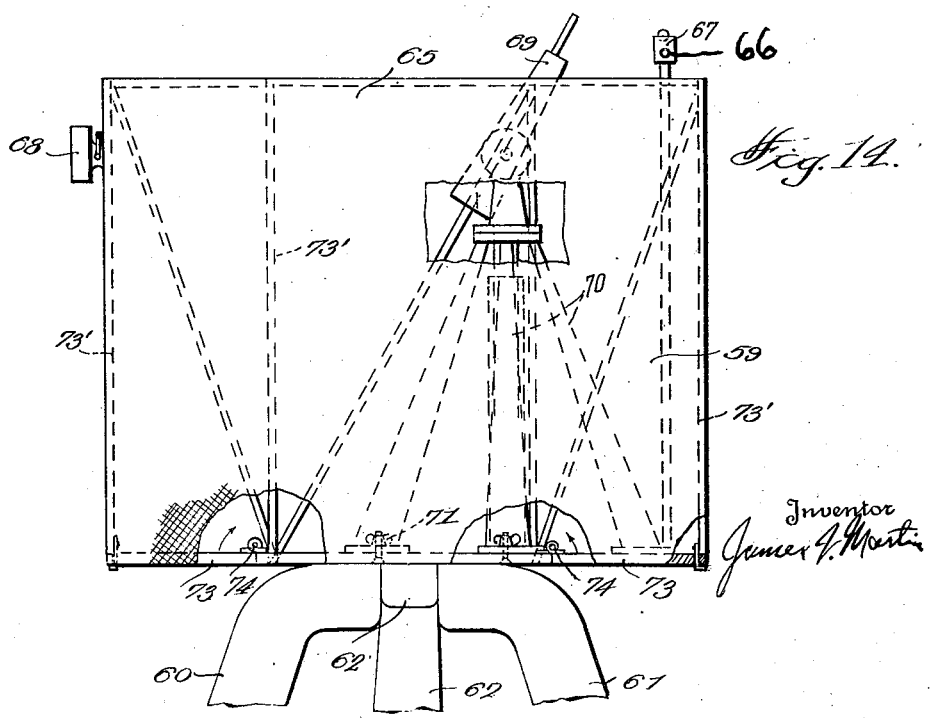

Dec. 19, 1944. J. V. MARTIN 2,365,205
WAVE RIDING SPEED VESSEL
Filed Nov. 7, 1940 8 Sheets-Sheet 8
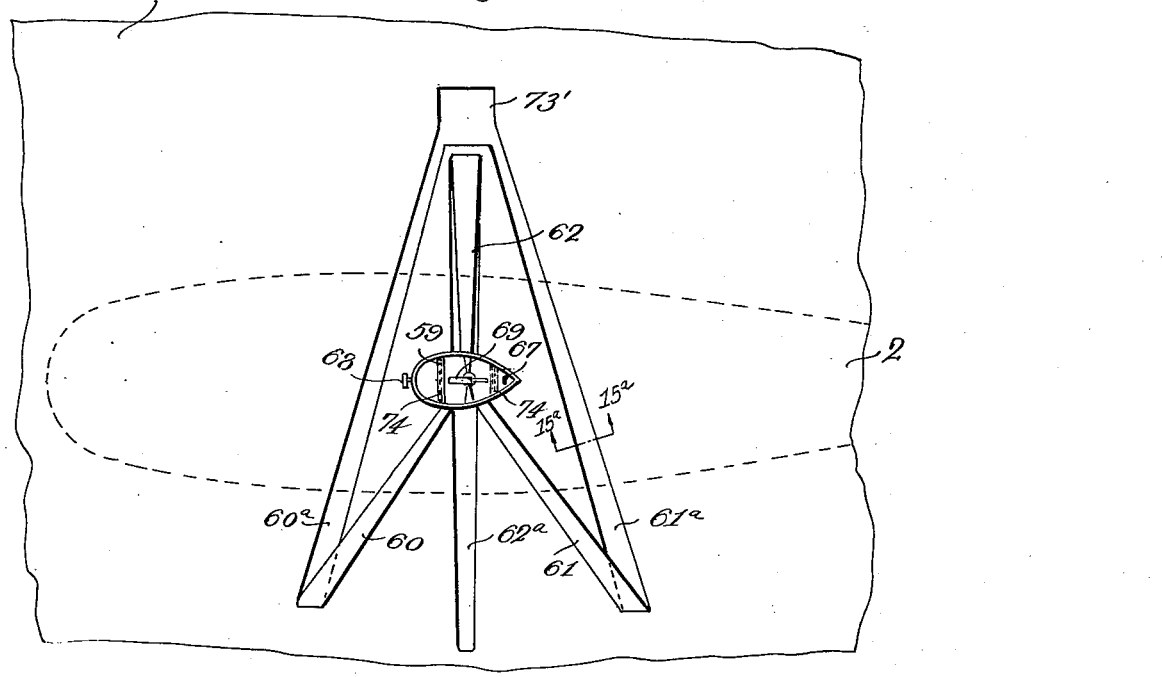
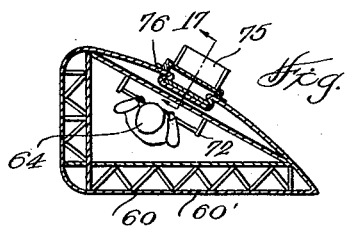
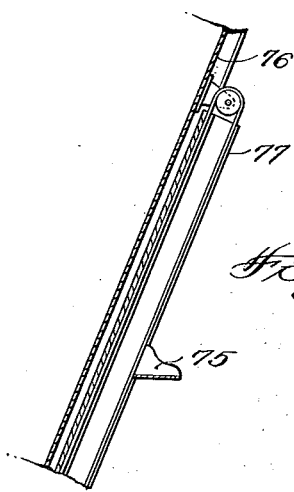
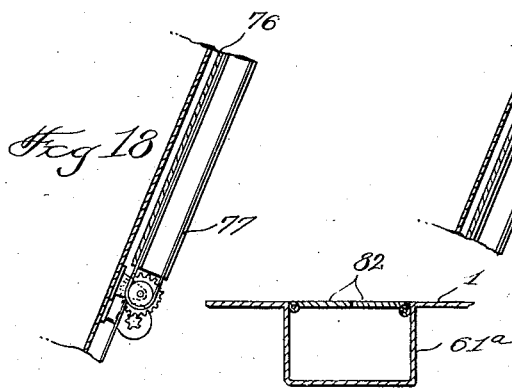

Patented Dec. 19, 1944

2,365,205

UNITED STATES PATENT OFFICE 2,365,205

WAVE RIDING SPEED VESSEL

James V. Martin, Hempstead, N. Y.

Application November 7, 1940, Serial No. 364,637

16 Claims. (Cl. 244—106)

This invention relates to a wave riding high speed vessel capable of cruising on the ocean surface in stormy weather and also able to leave the ocean surface and carry huge loads in flight.

The primary object of my invention is to provide an arrangement of wing and bodies which will keep all frail portions of the craft above the "greenwater," or solid impact of ocean waves and facilitate maneuverability of the vessel at the will of the pilot over a rough sea.

A further object of the invention is to adapt the craft for alternate use as a purely surface craft having a fighting or navigating top and special wave stress bracing between the wing and the twin hulls and to provide in the wing of the craft for the retraction and housing of these members when it is desired to use the craft in flight.

A further object is to provide a method by which a craft may cruise over the ocean surface for weeks at a time and for thousands of miles and then, upon short notice, discharge into the sea the surplus surface fuel and take to flight with a full flying load of gas and useful load.

A still further object of the invention is to provide a novel form of wing which will keep the wing tips clear of "green water" and at the same time have an excellent type of airflow and facilitate vision and gun firing from positions within its novel curvatures.

Other objects of the invention will become readily apparent from the following descriptions of the drawings and from the claims.

Fig. 1 is a view in front elevation of my invention.

Fig. 2 shows my invention in front elevation in three different wave aspects; A-2 shows the outline of the craft on the crest of a typical ocean wave. B-2 shows the outline of the craft in the trough and C-2 shows the outline in full lines with the twin hulls of the craft riding on the slope of the wave.

Fig. 3 is a plan view looking down upon my invention, and

Fig. 4 shows the craft in side elevation, looking at the port side of the port hull.

Fig. 5 is a view partly in section taken along the line 5—5 of Fig. 4.

Fig. 6 is an enlarged view with a portion broken away showing how one of my wing-body retractable braces is located and moved and housed in a slot in the underside of the wing.

Fig. 7 is an enlarged view partly in section taken along the line 7—7 of Fig. 6 and showing enlarged the slot in the body side-wall and the lower end of the wing brace secured within the slot.

Fig. 8 is a view partly in section taken along the line 8—8 of Fig. 6 and showing enlarged the mechanism which retracts the wing-body brace and also locks the end of same securely to the frame of the hull body.

Fig. 9 is an enlarged view partly in section showing the peculiar internal base location for a shell firing type of gun located in that portion of each wing part which curves upwardly to keep the same above the "green water" of wave impact, taken on the line 9—9 of Fig. 3.

Fig. 9a is a detail of the toothed track.

Fig. 10 is a front elevational view, enlarged and partly in section taken along the line 10—10 of Fig. 3 and showing the shell type gun mount capable of rotating the gun mount to a position entirely inclosed.

Fig. 11 is a view in front elevation of my fighting top for navigating and controlling the craft on the ocean surface: The wing top and bottom is indicated in section and the broken lines therewithin show the housed position of the navigating top when same is retracted.

Fig. 12 is an enlarged view of the said navigating top showing its base and means of supporting same.

Fig. 13 is a view in side elevation of the navigating top and the wing enlarged is sectioned along the line 13—13 of Fig. 3.

Fig. 14 is an enlarged view of the navigating top as seen in Fig. 13, but indicating gun platform and signaling devices in dotted lines.

Fig. 15 shows my streamlined navigating top in plan view and also indicates in dotted lines the hull-body position below the wing.

Fig. 16 is a view in section taken along the line 16—16 of Fig. 13 and

Fig. 17 shows in section how my elevator is rigged to one of the tripod struts of the navigating tops.

Fig. 18 shows, partly in section, the motor raising means for operating the strut hoist or elevator.

Fig. 6a is a sectional view taken along the line 6a—6a of Fig. 6, and shows how the cross-section of the brace 11 fits into the lower part of the wing 1.

Fig. 15a is a sectional view taken along the line 15a—15a of Fig. 15 and shows the two spring controlled doors to close slot 61a.

Proceeding now to the more detailed description of my invention, like numerals will indicate like parts throughout the several views, for example, 1 indicates a main monoplane wing having a straight section in front elevation (see Fig. 1) continuous across the upper portion of the twin hulls 2-S and 2-P, while the outer portions of the wing 1-S and 1-P are bent upwardly in a peculiar curve which not only elevates the wing tips to keep same from wave impact, but also preserves excellent aerodynamic lift/drag ratios throughout the flying range.

Very many wind tunnel tests have been made to obtain a bend-up for the wing and the one shown in the drawings is the best so far obtained from more than a dozen model variations: The region designated a—b—c in Fig. 3 seems the most sensitive to slight alterations and my tests indicate that with further work in this area a better than straight wing airflow may be obtained: My tests indicate that best results are had when the airflow follows the parallel shading lines seen in Fig. 3 and the frontal aspect a—b—c of Fig. 1. Tests indicated that a simple upward bend, without recurve, in the wing ends was very poor aerodynamically and also failed to preserve normal control characteristics; while the form of wing shown, with its sharp recurves and amount of taper, confined to the outboard portion, gave excellent lateral and turning control. By comparing Figs. 1 and 3 it will be noticed that I have confined the region of wing curvature to a very small percentage of the total wing area, i. e. more than fifty per cent of the total area is located in the straight central portion and this straight central portion persists laterally far enough to keep the smooth downwash located ahead of all the empennage surfaces.

The wing recurves are not only kept at positions which prevent their uneven back wash from interfering with the tail controls, but they are so close together as to provide a comparatively steep angle (see Fig. 9) for the gunner's position, so that he may stand erect in spite of a thinning down of the profile section of the wing at this place required for good airflow and also for structural weight saving. The thinning down retards burbling at the recurves (in the *abc* region) in yaw and combined with the sharp upward angle of the wing surfaces sliding panel openings become practical even for an upward gun angle from the lower surface panel.

Each hull is placed about midway between the wing center and the start of the wing up-bend, thus preserving the straight portion of the wing beyond the outboard motors and beyond the lateral ends of the empennage and nevertheless elevating the wing tips enough to clear the waves and allowing the most outboard wing sections sufficient horizontal inclination to acquire very fair lift components. 3 denotes ailerons of conventional pattern, 4 the horizontal control in rear and 5 typical air rudders. The airflow in the region of the body attachment to the wing is also very sensitive to slight changes and I have had best results by narrowing down the beam of the hull body where it joints the wing, see Fig. 5 and filleting between the body and wing connection.

6 indicates propellers driven by motors 7, in streamlined housings built into the fore part of the wing where ready access for repair or replacement may be made either while being driven by the other motors or while riding to a sea anchor.

The wing itself is of double stressed skin construction similar to my former disclosures in patents, Nos. 1,973,007; 2,068,300; 2,081,436 and 2,081,437, and in my co-pending application Serial No. 136,190 filed April 10, 1937.

The spaces in the wing inside of the various partitions, which are made by the fore wing spar 8, the rear spar 9 and the numerous (not all being shown) fore and aft ribs 10 is sufficient for human bodies to move about and accomplish various functions connected with an armed vessel or to serve passengers if the craft be used for transport: Naturally staterooms and living quarters can be readily arranged in these spaces and I have shown the partitions 10 only as typical or when accomplishing some special function such as for example forming a continuous truss where the retractable brace 11, see Fig. 5, joins the lower wing skins.

This brace 11 has an electric motor 12 and two V belt drives to operate the special locking devices shown in Figs. 7 and 8 and the end of the brace enters a slot 13 in the upper side wall of the hull on both sides and beneath each fore and rear spar: This slot is part of the transverse frame of the hulls, but is water sealed against leakage within the hull; it will be noticed that a rack 14 is located at the base of the slot and end bearings 15 on the brace carry a spur gear 16 which meshes with the rack to elevate the hull end of each brace when the same is not needed to resist the wrenching action of the waves on the two hulls: A study of this craft for stresses indicates that the worst condition prevails in rough seas and that none of the flying stresses require braces between the wing and the hulls. However the wave stresses are very heavy and in all possible directions which makes special locking means necessary to unite the frame and deck structures of the hulls to the retractable brace 11 and I provide a ball socket arrangement with the socket 17 located in the truss structure of the craft's main transverse frames 18. Into these sockets 17 which are located where the deck 19 joins the side frame, I have formed ball heads 20 on plungers 21; these plungers are journaled on a shaft 22 keyed to the V belt pulley 23 and are forced outward or inward according to the direction of the drive on the V belt, for example assuming the balls 20 firmly locked within the sockets 17, see Figs. 7 and 8. When the belt 24 is turned to retract the hull end of the brace 11 its first action is to withdraw the balls from their sockets before applying upward movement to the brace. This is accomplished by the pins 25 carried on the shaft 22 which travel along the spiral slots 26 in the plunger sleeves 21: The plunger sleeves have a cone face surface 27 which engages with similar surface 28 of the spur gear wheel 16, so at the inward extremity of the plunger movement it clamps the drive from the belt 24 to the gear 16 and starts to raise the end of the brace 11 and during this operation the ball heads 20 will be out of the way. A portion 29 of the roller head 20 retains pressure at 30 to hold the gear 16 against the rack 14 at all times and the upper end of the brace 11 slides in a lower wing slot 31 and locks to the wing truss at 32 like the ball socket arrangement shown in Figs. 7 and 8 and the V belt 33 from the electric motor 12 also operates the plungers to lock and to unlock the strut 11. As the sliding movement is only sufficient to accommodate the travel due to the curve of the slot 13 electric wires 34 with sufficient slack can be attached to the strut 11 from the wing interior to allow for control and power to the motor 12. When the brace 11 is fully retracted it is housed within a slot 35 in the lower wing surface, see Fig. 6a. A catch 36 cuts off the motor current automatically and also holds the brace 11 within the slot 35 in its extreme raised position and by switching on 36' the current again from the pilot's control cabin 37 the catch releases the strut 11 and same descends to its limiting stop 38 by gravity, the motor 12 all the while turning with the descent, but when the gear 16 can no longer turn because of the limiting stop 38 then the continued motion of the motor will force the ball heads 20 into the sockets 17 and a like release at the upper end of the brace 11 will cause a similar locking at 32 so that the brace will communicate all tension and compression stresses from one hull through the braces on both sides to the wing spar trusses and carry same through the transverse frames of the hull structure including the deck 19.

The hull has a lower deck 39, supported from a built-up keel structure 40 which joins the concave bottom portion 41 of the hull, see Fig. 5; this bottom is provided with a step 42, Fig. 4. Guard strips 43 at or preferably just above the water line enable lighters to bring passengers or goods to a comparatively lee position between the two hulls without injuring the hull sheeting and a hatchway 44 permits ready lifting of goods or passengers into the interior of the wing forward passageway 45 by means of the traveling hoist 46 which travels along a toothed track 47: This track is conveniently located just forward of the craft's center of gravity so it can transfer considerable loads, as for example a spare motor, without disturbing fore and aft balance and at the same time in close proximity to the engine rooms and the track continues along the upward slope of the wings, see Fig. 9, so as to readily handle the guns 48 located there.

As a naval vessel or as an extra long voyage vessel the present craft has certain novel advantages including the ability to ride high waves at approximately double the speeds possible with merely surface craft: It is well known that the momentum in the hull of very high speed vessels compels them to slow down because of the successive superbuoyancy and under buoyancy derived in an effort to traverse waves at high speeds: The present invention aims to dampen out the extreme rise and fall of the hulls through the influence of the wing 1 on the hulls 2-S and 2-P; with this influence operating to permit higher surface speeds than would otherwise be possible, my invention is provided with surface cruising gas tanks 49 while full flight long range gas tanks 50 can be available for flight after the craft has crossed the ocean on its surface using only the surplus or surface gas. Also in addition to swash plates and other conventional gas tank equipment I provide a pressure and seacock means 51 of rapidly discharging all nonflying gas into the sea so that an emergency flight may be commenced at any time. A valve 52 permits the gasoline to escape from the tank 49 where it is under heavy air pressure through pipes 53' from the air bottles 53 which can be replenished by power pumps within the craft in a well known manner.

The guns 48 are of shell firing capacity and mounted slidably on a firmly platform 48'; the slides permit both lateral and fore and aft movement of the gun and sliding panels 48a permit aiming the guns through large upper angles, while fore and aft sliding panels 48a and 48b permit firing in various lower angles some of which are indicated by the broken line outlines of the guns in Fig. 9.

I provide in the fore upper part of each hull a disappearing shell firing gun 53 mounted upon a reversing rotatable platform 54 power operated by means of reduction gears 55 and electric motor 56. Means to secure the platform in both its positions are provided at 57 and at 58. This is located just aft of the pilots' flying cabins 37. But for surface navigation I supply a novel fighting top or navigating bridge, see Figs. 11, 12, 13, 14 and 15. This is streamlined as will be seen from plan in Fig. 15 and is held well aloft by three tripod legs 60, 61 and 62, also these struts are given a somewhat streamlined form as seen in the enlarged view Fig. 16, with a face 60' adapted to form a substantially smooth upper wing surface over the slots 60a, 61a and 62a into which the struts retract respectively when the craft is prepared for flight. The line of sight in this navigator's top is well above the highest points of the wing ends as indicated in Fig. 13 by the broken line 63 which is the upper level of the wing tips. The scale of a man 64 shows how a convenient observation position behind the weather cloth 65 allows one or two men to signal or fire from the fighting top and to direct the control of the craft through the phone tube 66 carried on the blinker stand 67: A forward headlight which can be used also as a searchlight is indicated at 68 and a machine gun 69 is mounted on a telescopic stand 70, removably secured to the top's platform by hand screws 71.

I show the fighting tops erected over the main portion of the port hull in Figs. 11, 12, 13 and 15 and in Fig. 3 the port top is shown retracted within its slots and a similar starboard top is shown also retracted and blended into the wing upper surface. This permits either top to be elevated and used optionally or if one of the tops should be shot away the other would be available.

The tripod legs or struts may be formed as shown in Fig. 16 with an internal ladder 72 on which a man 64 can have protected passage from within the wing of the craft through an appropriate hole, not shown, in the platform 73 of the top 59. This platform is pivotably mounted on two integral legs 60 and 61 of the tripod, so that it lays out flat in the retracted position, see Fig. 11 and outline in broken lines in Fig. 11 and full lines of slots in Fig. 15 where the space for the platform is indicated at 73'. The platform is hinged at 74, Fig. 14, so that its fore and aft parts may be folded over its central part after the gun mount 70 has been unshipped and sent below decks on the strut hoist 75 which is power elevated along the track 76 by the gear driven belt 77 in well known manner. The weather cloth 65 retains the removable platform struts 73' in place and all the electric connections needed for the blinker lights and other devices of the top (not shown) should be led up from within the wing through the strut 60 because that is always connected to the pair of struts 60 and 61: See the pivot 60b, Fig. 12. The strut 62 on the contrary, is elevated after the first pair of struts are started into their ascent and a bent projection 62' of the strut 62 tilts the platform 73 into a horizontal position as shown in Fig. 12, at which time an automatic catch 62b locks the platform securely by subtending lug 73a. When the platform has been prepared for retraction again the cable 78 may be pulled from within the wing to release the platform, after which the struts may be lowered into their respective wing slots. The base of each strut is well supported pivotally at its base on journal braces 60c, 61c and 62c which are attached to the basic wing structure spars 8 and 9 and to the fore and aft walls 18 while electric motors 79 raise and lower the struts through worm and gear and an arc 80.

It will be evident that my craft is essentially a surface, wave riding craft capable of being quickly converted and for emergency purposes into an aeroplane or flying twin hull boat.

Normally the navigating top 59 is in elevated and operable position with electric leads through one of the streamlined struts such as that shown in Fig. 16 to enable phoning and signal lighting back and forth from most parts of the ship. A radio antenna 81 can conveniently be stretched from the top 59 to the empennage.

Not only does the retractable top permit observation over the horizon to advantage but that type of machine gun mount 70 which raises and lowers and fires in all directions can be used effectively.

An uncommon advantage of having the man's (64) eye in the most elevated position on the craft is that any other ship should be visible to the oceanplane observer before the oceanplane itself can be seen: The masts for example of a battleship could be seen before the very small head projection of a man could be discerned and even if a fast naval destroyer should see the oceanplane fighting top above the horizon and start pursuit, the top could be quickly divested of its paraphernalia by means of the hoist 75 and while the excessive speed of the oceanplane craft enabled it to outdistance its pursuer the top could be lowered away into the wing slots 62a, 61a and 60a so that the pursuing craft would never be able to again bring any part of the oceanplane into view. When the fighting top is in elevated position I provide a water tight cover 82, Fig. 15a, for the slots 60a, 61a and 62a to prevent rain and spray from entering into the wing: This automatically comes into place by spring actuation when the struts near their extreme elevated positions.

The principle upon which the invention is made possible may be termed "proximate buoyancy," meaning that relationship of hulls and wing tips in both vertical and horizontal distances which will take into account the slopes of ocean waves, their heighth and their maximum horizontal rate of progression and provide in each hull such excess of buoyancy that the wave slope will raise the adjacent wing end within the time interval necessary to clear all parts of the solid or "green water."

The empennage is raised well above wave danger and it is predicted for this invention that, while its novel form of wing combined with its proximate buoyancy will permit riding of the highest waves, that at least double the horizontal velocity can be maintained over the waves due to the damping influence of the wing on the rise and fall of the hulls as contrasted with hulls not having their momentum vertically dampened or moderated. It has long been practical to construct ocean speed craft capable of 100 miles per hour on a smooth ocean surface, but the undampened momentum of the hulls has stood rigorously in the way of any appreciable high speed over waves.

This novel craft also has an additional feature in its comparative low aspect ratio over the so-called Clipper type of over-ocean boats in that the ratio of the hull vertical side area directly under the chord of the wing builds up a rolling type of air cushion between the ocean and the wing and hulls so that if the craft is kept within some fraction of its chord distant from the ocean excess lift is obtained at very slight, or in some cases, no increase of drag: In fact, certain tests of this phenomena indicate that if the craft is brought up onto its planing step the power of the motors may be so reduced that about 25% or 30% of the full power output will suffice either to drive at high speed on the surface or to keep a few feet above the waves. Thus the novel method of having purely surface tanks 49 located in the hulls or in the wings will provide fuel for long over ocean trips without impairing the actual flying gas stored in other tanks, such as 50.

The sliding panels 48a and 48b should be arranged in accordance with my former disclosures and co-pending application to prevent ingress of rain or spray when covering the wing at the shell gun 48 and I advise that these panels be transparent for vision: In case the craft is used for passenger transport this region of the wing will afford a very comfortable observation room.

The improved hoist 46 travels on a track 47 that has teeth gear means of providing positive traction up the steep slope of the bent wing at a, b, and c areas and when the ship lists heavily.

Fig. 5 shows an improved arrangement of deck and keel structure to provide watertight compartments 40' and to make as much of the cubic area available for passengers and freight as possible. Communicating facilities such as shown in my co-pending application, above noted, can be had between decks and I advise use of the hatches 44' and 44a located directly under the track 47 to lower away goods or passengers picked up from lee water lighters through hatch 44 or transferred from other portions of the craft either at anchor or on the surface or in full flight.

A door 45 (see Fig. 13) can be used to close off the passageway, laterally, but it should be hinged at its bottom so as not to interfere with the track on which the hoist travels.

Fig. 6a shows a catch 36 operated one way by a spring and the opposite way by a pull cord 36' to the pilot in the fighting top 59 or in the cabin 37, also an electrical contact 34 leading to the motor 12 in the brace 11, so that both the slope of the brace 11 as it moves into the wing slot 35 and the spring or the pull cord may be used to short the motor or to start it and release the brace 11.

As stated heretofore four braces lead from each hull to their locking stations 32 on the under wing slots 31. It will be understood that the slot doors or cover 82, Fig. 15a are pressed down against their spring type hinges by contact of the legs of the tripods 60, 61 and 62 when they begin to enter their respective slots, and that as the tripods are raised these doors close and are watertight.

It will be understood that the doors 82 can be built in sections so as to permit entrance of the elevator 75 into the wing when the tripod is in elevated position, or the hoist may be proportioned and arranged inwardly, in place of the ladder 72 in one strut, see Fig. 16, and the ladder can be used in another strut. 8' denotes diagonal bracing in the wing spars as for example 8.

45' indicates hinge on bottom of door, see Fig. 13, and passageway 45.

In Fig. 1 the water line W—W is indicated for the flying plus the surface gas and even in this extreme loaded conditions the fore part of the guard strip 43 is out of the water: The bomb load is also aboard.

What I claim is:

1. In combination with an aeroplane wing having a substantially straight central portion and a compound reverse curvature of its wing form in frontal elevation, an observation platform located between inclined surfaces of the said reverse curves and portions of both the upper and lower wing surfaces provided with openings between the said reverse curves, said openings located in the said inclined surfaces, whereby an observer standing erect between the said inclined surfaces may see horizontally above the said central portion and horizontally below the outer portion of the said wing.

2. In an aeroplane wing having a straight central portion and sharply recurved outboard portions with steeply inclined upper and lower wing surfaces a gun mount located between said inclined surfaces and means to move the said gun slidably on said mount from an interior to an external position.

3. The combination in a wave riding vessel of an observation top located above the upper surface of an aeroplane wing including streamlined struts spacing the said top above the said wing, protected means of communication from within the said wing up through the interior of one of the said struts to the said top and means to rig down the said top and struts and to house the same in apertures shaped therefor in the said wing.

4. A wave riding ocean vessel including two spaced apart hulls having a main wing attached to and inclosing useful load compartments over the tops of the said hulls, the ends of the said wing curved upwardly toward their ends to positions above the tops of the said compartments and a navigating top held aloft over one of the said hulls and part of the said wing, communicating and control facilities passing from the said top into the interior parts of one of the said hulls and the said top including a streamlined observer's position located in a plane above the highest points of the said wing ends and means to lower the said top and struts and house them within the said wing.

5. In combination with a twin hull oceanplane, a main wing connected to and arranged as the upper deck of each said hull, an observation top held aloft by struts above the said wing and hull, slots located in the upper surface of the said wing, power means within the said wing and connected to the said struts to raise and lower the said struts into and out of said slots and means to close the said slots against ingress of water when the said struts are not housed therein.

6. In combination with an observer's top located above the wing of an oceanplane, retractable struts spacing the said top from housing slots for receiving said struts in retracted position located in the upper surface of the said wing, said struts connected to said top and wing and a hoisting device guided on a track upon one of the said struts and adapted to elevate goods from within said wing along the said track to the said top.

7. In combination with a wave riding vessel having a wing located on the upper part of the said vessel, struts and a housing in the said wing for the said struts, means to elevate the said struts from separate bases within the said wing and engaging means at the upper ends of the said struts whereby the same form a firm support for an observation top and means to disengage the said engaging means and to lower the said struts to a position within the said housing.

8. In an oceanplane having two spaced apart hulls held in parallelism by, a wing having a comparatively straight central section in front elevation extending between and at substantially right angles on both sides of the said hulls, the said wing being biconvex and provided between its upper and lower surfaces with passenger and goods compartments and the said wing having end portions located laterally beyond the said central section extending upwardly and outwardly in a compound reverse curve from the said central section, whereby a wave of the ocean will raise one of the said wing ends above said wave's highest point by means of the emersion of the excess buoyancy of the adjacent hull in the ascending slope of the said wave.

9. In an aeroplane a main wing having a substantially straight central section in both frontal elevation and in plan view, said wing being biconvex in side elevation profile and providing housing compartments within its biconvex upper and lower surfaces, said wing also including lateral wing ends forming upward and outward compound reverse curves in both the said upper and lower biconvex surfaces and affording a continuation laterally of the housing compartments of the said central section, and an observation position including means for visibility for the observer through the upwardly curved portions of the said wing ends.

10. In an aeroplane, a wing providing passenger and goods housing space distributed laterally throughout its central portion and extending said housing space into its wing ends, the said wing ends being upwardly bent in compound curves of both the upper and lower wing surfaces and means including laterally spaced apart catamarans supporting the said wing on a wave disturbed ocean surface and adapted through lateral spacing and superbuoyancy to raise the said wing ends above the crest of the wave in which the adjacent catamaran is immersed.

11. The combination with a multideck hull oceanplane, of retractable braces, a watertight slot indentured into the wall of each side of the said hull, means to guide an end of each said brace up and down in the said slots and automatic means of locking the said ends in the said slots at a position adjacent a'tween deck of the said hull.

12. In combination with a twin hull wave riding vessel, a main wing forming a truss to hold the said hulls in parallelism, said wing having a comparatively thick central section to contain the said truss and also to provide a passenger and goods compartment, power units disposed in nacelles directly ahead of the leading edge of the said wing and on both sides of the said hulls and interior communicating passages between said nacelles and said wing compartment, the said wing having upward and outward reverse curves located laterally outwardly from the positions adjacent the outermost of said power units and providing a continuation of the said passenger and goods compartment into the said elevated wing ends each adjacent hull and wing tip related in superbuoyancy and location to the slope of an ocean wave, whereby the immersion of said hull is adapted to raise the said wing end above all portions of the said wave.

13. A twin hull ocean craft including a comparatively thick main wing holding the said hulls in parallelism by means of an internal wing truss, the said wing being straight in both plan and front elevational view on both sides of each said hull over more than half its span and of biconvex form where the said truss joins the said hulls, said wing also containing within its biconvex surfaces laterally continuous compartments for human occupation formed between the partitions of the said truss members, the said wing having sharply upwardly reverse curved wing ends providing continuations of the said compartments, and located outwardly beyond the adjacent hull whereby its interior load is adapted to be raised above wave impact through the buoyancy afforded by said adjacent hull.

14. In combination with an aeroplane wing having a substantially straight central portion and upwardly bent wing tips, said tips located in planes above the uppermost portions of the said central portion, an observation top, streamlined retractable struts attached to and supporting said observation top in spaced relation to the upper part of the said wing, housings in the said wing part and said struts formed so that one of their sides closes the said housings when said struts are retracted, and when not so housed said struts adapted to support the said observation top.

15. A wave riding vessel including a main wing of substantially horizontal form in frontal elevation in its central part supported on the water surface by two spaced apart hulls; a horizontal rear stabilizer carried by the rearward extensions of the two said hulls, a power unit located in a nacelle extending out of the forward portion of the said central wing part and laterally outwardly of each of said hulls, the said power unit lying laterally outwardly beyond the vertical plane of flight which contains the laterally outer limits of the said horizontal stabilizer, and the said wing beyound its said central part and laterally beyond the said power unit provided with a sharp reverse curve upward bend, whereby the wing ends are raised by the adjacent hull above wave impact and whereby the disturbed backwash from said curved wing portions passes laterally beyond the said horizontal stabilizer.

16. The combination of a twin hull wave riding oceanplane having a main wing attached to and extending over the upper portions of the said hulls, motors each having a propeller shaft located along the central portion of the said wing and on both sides of both said hulls, the said wing from its center laterally of substantially straight upper and lower surface in frontal elevation as far as the said propeller shafts of the most outboard motors and the wing portions lying outwardly laterally of the last said motors curved upwardly at a large angle and still further from the said motors said wing ends provided with a less upward angle in frontal elevation and a gun and gun mount located within the said wing in the region of the first said upward curvature and means to slide the said gun on the said mount for firing through openings in the most steeply inclined upper surface of the wing and downwardly through openings in the most steeply inclined lower surface outwardly or the said larger angle of wing curvature.

JAMES V. MARTIN.